(12) United States Patent
Barnes

(10) Patent No.: US 12,158,732 B2
(45) Date of Patent: Dec. 3, 2024

(54) CUSTOMIZABLE DIGITAL WATCH

(71) Applicant: Alisha Barnes, New York, NY (US)

(72) Inventor: Alisha Barnes, New York, NY (US)

(*) Notice: Subject to any disclaimer, the term of this patent is extended or adjusted under 35 U.S.C. 154(b) by 396 days.

(21) Appl. No.: 17/516,811

(22) Filed: Nov. 2, 2021

(65) Prior Publication Data

US 2022/0206442 A1    Jun. 30, 2022

Related U.S. Application Data

(60) Provisional application No. 63/131,569, filed on Dec. 29, 2020.

(51) Int. Cl.
*G04G 17/04* (2006.01)
*A44C 5/00* (2006.01)
*G04G 21/04* (2013.01)
*G04G 21/08* (2010.01)
*G06F 3/0488* (2022.01)

(52) U.S. Cl.
CPC ......... *G04G 17/045* (2013.01); *A44C 5/0015* (2013.01); *G04G 21/04* (2013.01); *G04G 21/08* (2013.01); *G06F 3/0488* (2013.01)

(58) Field of Classification Search
CPC ...... G04G 17/045; G04G 21/04; G04G 21/08; A44C 5/0015; G06F 3/0488
USPC ........................................................ 368/223
See application file for complete search history.

(56) References Cited

U.S. PATENT DOCUMENTS

| | | | |
|---|---|---|---|
| 9,904,254 B1* | 2/2018 | Hariri | G04G 9/0064 |
| 2011/0157046 A1* | 6/2011 | Lee | G06F 1/1643 |
| | | | 345/173 |
| 2017/0068225 A1* | 3/2017 | Chen | G04G 19/00 |
| 2017/0084133 A1* | 3/2017 | Cardinali | G04G 9/0064 |
| 2017/0214422 A1* | 7/2017 | Na | H01Q 7/00 |
| 2017/0364035 A1* | 12/2017 | Tang | G04G 9/0088 |
| 2018/0132574 A1* | 5/2018 | Rittenhouse | A44C 5/0053 |
| 2018/0210491 A1* | 7/2018 | Song | G06K 19/07773 |
| 2018/0294553 A1* | 10/2018 | Lim | H01Q 5/35 |

(Continued)

FOREIGN PATENT DOCUMENTS

| | | | |
|---|---|---|---|
| CN | 106343669 A | * | 1/2017 |
| EP | 0197187 A2 | * | 10/1985 |

OTHER PUBLICATIONS

Ryan Christoffel, Apple Debuts New Seasonal Colors for iPhone and iPad Cases and Apple Watch Bands, MacStories (Mar. 18, 2020) https://www.macstories.net/news/apple-debuts-new-seasonal-colors-for-iphone-and-ipad-cases-and-apple-watch-bands/ (Year: 2020).*

(Continued)

*Primary Examiner* — Edwin A. Leon
*Assistant Examiner* — Kevin Andrew Johnston
(74) *Attorney, Agent, or Firm* — Brennan, Manna & Diamond, LLC

(57) ABSTRACT

A customizable digital watch configured to receive digital audio and video content operable independently from a smartphone. The customizable digital watch illuminates and allows access to radio and televised content. A display component accepts user input to control the features. A wireless communication component is configured to communicate via GPS, Wi-Fi, Bluetooth, or NFC. A customizable strap component is attachable to the display component. The customizable strap component is reversible and comprises a first indicia on an inside facing side and a second indicia on an outside facing side.

5 Claims, 5 Drawing Sheets

(56) References Cited

U.S. PATENT DOCUMENTS

2019/0086964 A1* 3/2019 Hong .................. H04M 1/0268
2020/0050154 A1* 2/2020 Spencer ............... G04G 17/083
2020/0319600 A1* 10/2020 Hachiya ................ G04G 21/02

OTHER PUBLICATIONS

Andrew O'Hara, Review: UAG's rugged silicone Apple Watch straps add a stainless steel clasp, AppleInsider (Mar. 23, 2020) https://appleinsider.com/articles/20/05/23/uags-rugged-silicone-apple-watch-straps-add-a-stainless-steel-clasp (Year: 2020).*
A Blog to Watch, SteelConnect Remod X Watch Straps (May 15, 2018) https://www.ablogtowatch.com/steelconnect-remod-x-watch-straps/ (Year: 2018).*

* cited by examiner

CUSTOMIZABLE DIGITAL WATCH

CROSS-REFERENCE TO RELATED APPLICATION

The present application claims priority to, and the benefit of, U.S. Provisional Application No. 63/131,569, which was filed on Dec. 29, 2020 and is incorporated herein by reference in its entirety.

FIELD OF THE INVENTION

The present invention generally relates to the field of smart wearable watches, and more specifically to a customizable digital watch configured to illuminate and to connect to remote digital and audio content. Accordingly, the present specification makes specific reference thereto. However, it is to be appreciated that aspects of the present invention are also equally amenable to other like applications, devices, and methods of manufacture.

BACKGROUND

By way of background, a watch is a portable timepiece configured to be carried or worn by a person. Watches are designed to provide the current time, date, and other related information. People originally used a watch to quickly identify the time of day. A wristwatch is a watch that is designed to be worn around the user's wrist. A wristwatch comprises a watch attached to a watch strap or other type of bracelet, such as a metal band, a leather or plastic strap, or any other kind of bracelet. The wristwatch allows the user the convenience of immediately accessing the watch information by simply turning their wrist.

A smartwatch is a type of a wearable computer that is configured to resemble a traditional watch. Typical smartwatches provide a user interface, typically in the form of a touchscreen. Smartwatches can perform basic tasks, such as providing a digital display of the time and date and performing mathematical calculations. Smartwatches have evolved to also function as a translator, provide a platform for digital games, to receive and send digital information, and to function as an alternative to a telephone. Internet connectivity can allow for general Internet access and access to mobile Apps when paired with a smartphone. It is not uncommon for smartwatches to function as portable media players, with radio, digital audio, and video capability when paired with a smartphone.

Digital watches generally have an electronic visual display that is connected by a wrist strap. They are powered by an internal battery and are often rechargeable. Other functionalities may include peripherals, such as digital cameras, pedometers, GPS receivers, and the like. These devices are capable of using software configured to organize daily life. Digital watches may be able to pair with and communicate with external devices such as sensors, wireless headsets, or a heads-up display.

Unfortunately, smartwatches generally require a connection with a smartphone or other Internet connectable device to fully function and have many limitations. Accordingly, there is a great need for an independent smartwatch that can illuminate. There is also a need for a customizable digital watch. Similarly, there is a need for a wearable device that can independently connect to the Internet without the need to pair with another Internet connected device. There is also a need for a smartwatch that can remotely access audio and video signals. Further, there is a need for a way to watch television or listen to the radio through a smartwatch.

In this manner, the improved commemorative system of the present invention accomplishes all of the forgoing objectives, thereby providing an easy solution for accessing the digital content without the need for another Internet connected device. A primary feature of the present invention is an independently functional smartwatch that can illuminate and adjustably secure to a user's wrist. The present invention allows the user to remotely access audio and video signals. Finally, the improved digital watch of the present invention is capable of customizing the device to suit a user's preferences.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one embodiment thereof, comprises a customizable digital watch. The customizable digital watch comprises a display component and a customizable strap component attachable to the display component. The display component is configured to receive audio and video signals. The customizable strap component is reversible and configured to adjustably engage a user's wrist. The customizable digital watch is a smartwatch configured to allow a user to change the overall look of the customizable digital watch while providing remote access to television and radio programming.

The display component comprises a housing. The housing comprises an inward facing side and an outward facing side connected along a perimeter. The housing may further comprise a plurality of user controls integrated into the outward facing side or the perimeter. The housing may further comprise a recharging port for accepting a power cord. The display component further comprises a user interface. The user interface is a display screen integrated into the outward facing side of the housing. The display screen may be a touch activated screen comprising a plurality of user controls for operating the display component. The display screen is used to display time and date in addition to visual digital media.

The display component may further comprise at least one speaker and at least one microphone integrated into the housing. The display component may further comprise at least one processor and a wireless communication component operatively connected to the at least one processor. The at least one processor and a wireless communication component are retained internally within the housing. The wireless communication component is used to wirelessly access remote audio, digital, and video content.

The customizable strap component attaches to the housing at a pair of strap attachment portions of the housing. The customizable strap component comprises a first strap which may be a single band. The customizable strap component may further comprise a second strap. An attachment component is used to adjustably connect the first and second straps around the user's wrist.

The first strap comprises an inside facing side and an outward facing side. The inward facing side comprises a first indicia and the outward facing side comprises a second indicia. Similarly, the second strap comprises an inside facing side and an outward facing side. The inward facing side similarly comprises the first indicia and the outward facing side comprises the second indicia of the first strap. Each of the strap attachment portions may be rotatable allowing the customizable strap component to reverse in orientation so that the first indicia on the inward facing side faces outward.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION

Figure 1:
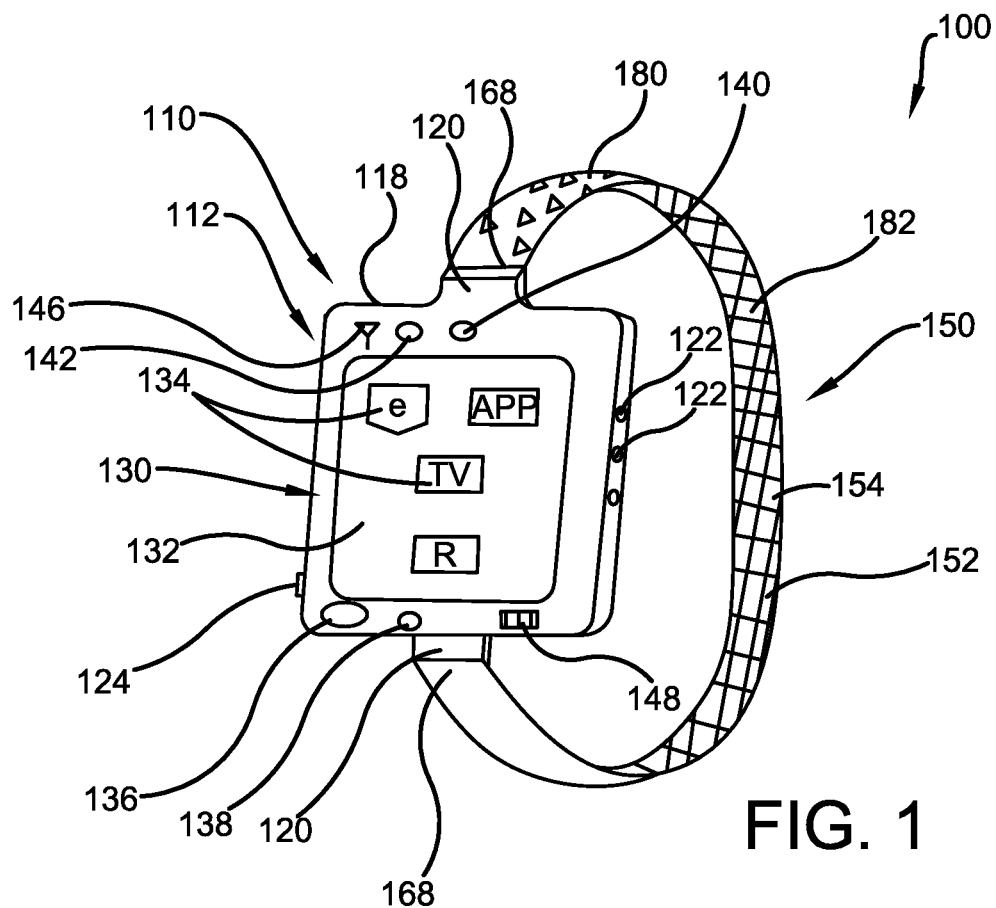
FIG. 1 illustrates a front perspective view of a customizable digital watch of the present invention in accordance with the disclosed architecture.
Figure 2:
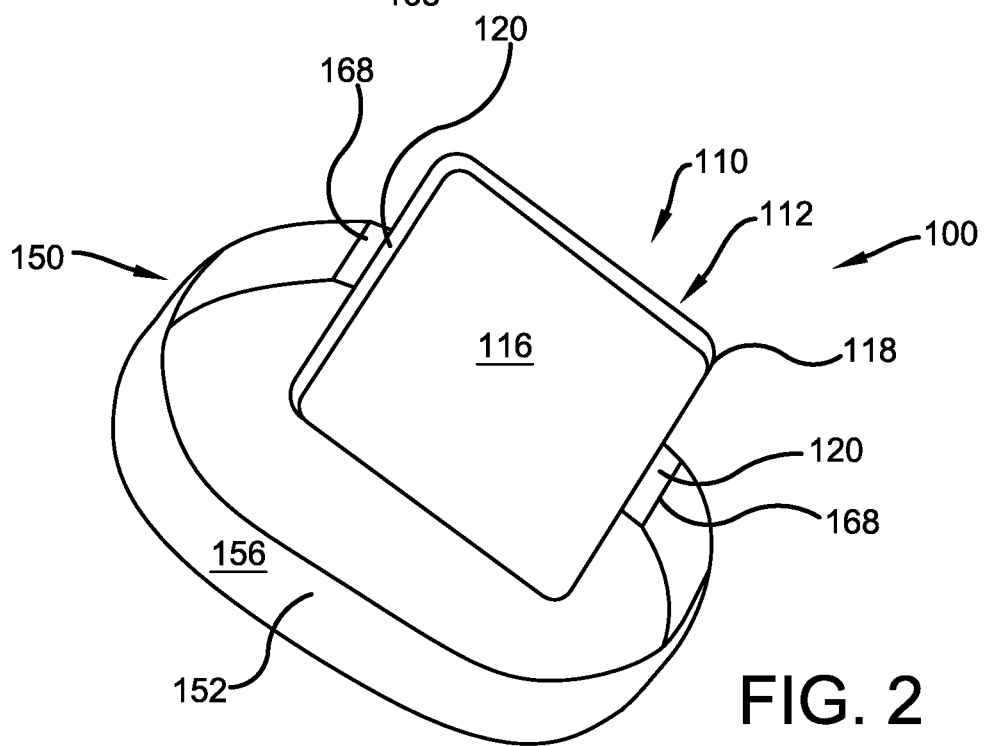
FIG. 2 illustrates a rear perspective view of the customizable digital watch of the present invention in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They do not intend as an exhaustive description of the invention or do not limit the scope of the invention. Additionally, an illustrated embodiment need not have all the aspects or advantages shown. Thus, in other embodiments, any of the features described herein from different embodiments may be combined.

The present invention, in one exemplary embodiment, is a customizable digital watch with an illuminated display. The customizable digital watch features an adjustable wrist band to secure the watch comfortably to the wrist. The customizable digital watch features a display screen, at least one speaker, and at least one microphone that work in conjunction to display a desired feature on a watch face. Wireless connections allow the customizable digital watch to receive remote audio and video signals through Wi-Fi, Bluetooth, or the like. The customizable digital watch is configured to provide remote access to television and radio programming.

The customizable digital watch comprises a housing with a display screen and an adjustable band for securing the housing to the wrist of a user. The housing further includes a power source, a processor, a memory, a speaker, a microphone, and other electronic accessories. The device can be configured to receive remote audio and video signals via Wi-Fi, Bluetooth, or other wireless networks. The device can play back sound and video from television, radio, and other sources. The adjustable band includes a reversible construction and can be customized with various images or other materials.

Referring initially to the drawings, FIGS. 1-10 illustrate a customizable digital watch 100. As illustrated in FIGS. 1-4, the customizable digital watch 100 comprises a display component 110 and a customizable strap component 150. The customizable strap component 150 is adjustably attachable to the display component 110. The display component 110 is configured to receive audio, digital, and video signals. The customizable strap component 150 is reversible and configured to engage a user's wrist. The customizable digital watch 100 is a smartwatch configured to allow a user to change the overall look of the customizable digital watch 100 while providing remote access to television, radio, or other digital programming. The customizable digital watch 100 is battery operated and may be rechargeable.

The display component 110 comprises a housing 112. The housing 112 is typically metal or plastic in construction and may be circular, oval, square, rectangular, or any other geometric shape as desired as further illustrated in FIGS. 5 and 6. The housing 112 is water resistant or waterproof in construction. The housing 112 comprises an inward facing side 116 and an outward facing side 114. The inward facing side 116 and an outward facing side 114 are connected along a perimeter 118.

The housing 112 may further comprise a plurality of user controls 122, such as buttons, dials, keys, or similar touch controls, integrated into the outward facing side 114 or the perimeter 118. The plurality of user controls 122 may be on/off or power controls, volume control, illumination controls, camera controls, or the like. The housing 112 may further comprise a recharging port 124 for accepting a power cord and recharging an integrated battery 148. The battery 148 is typically a Lithium-ion or similar battery.

Figure 3:
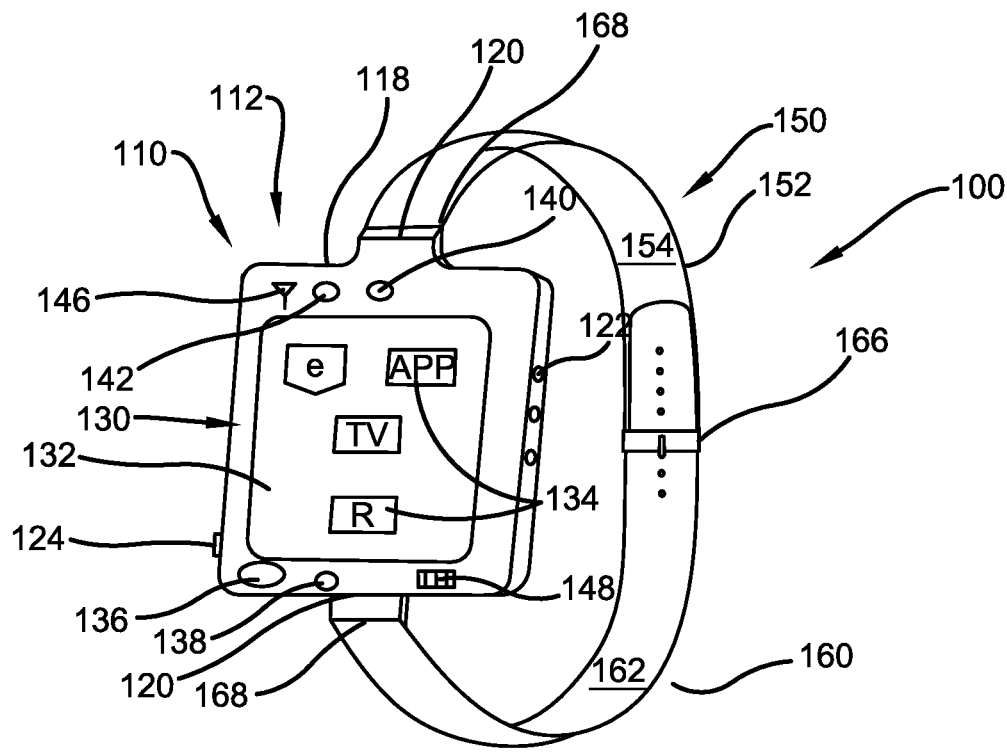
FIG. 3 illustrates a front perspective view of the customizable digital watch of the present invention in accordance with the disclosed architecture.
Figure 4:
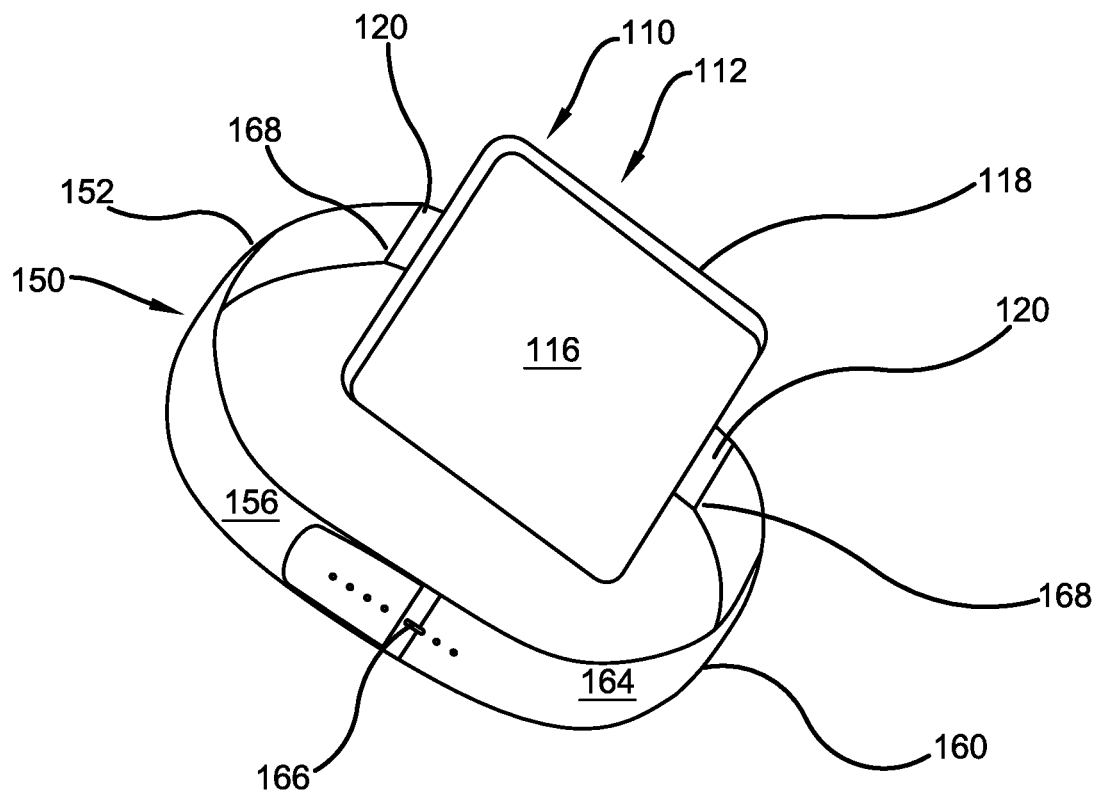
FIG. 4 illustrates a rear perspective view of the customizable digital watch of the present invention in accordance with the disclosed architecture.
Figure 5:
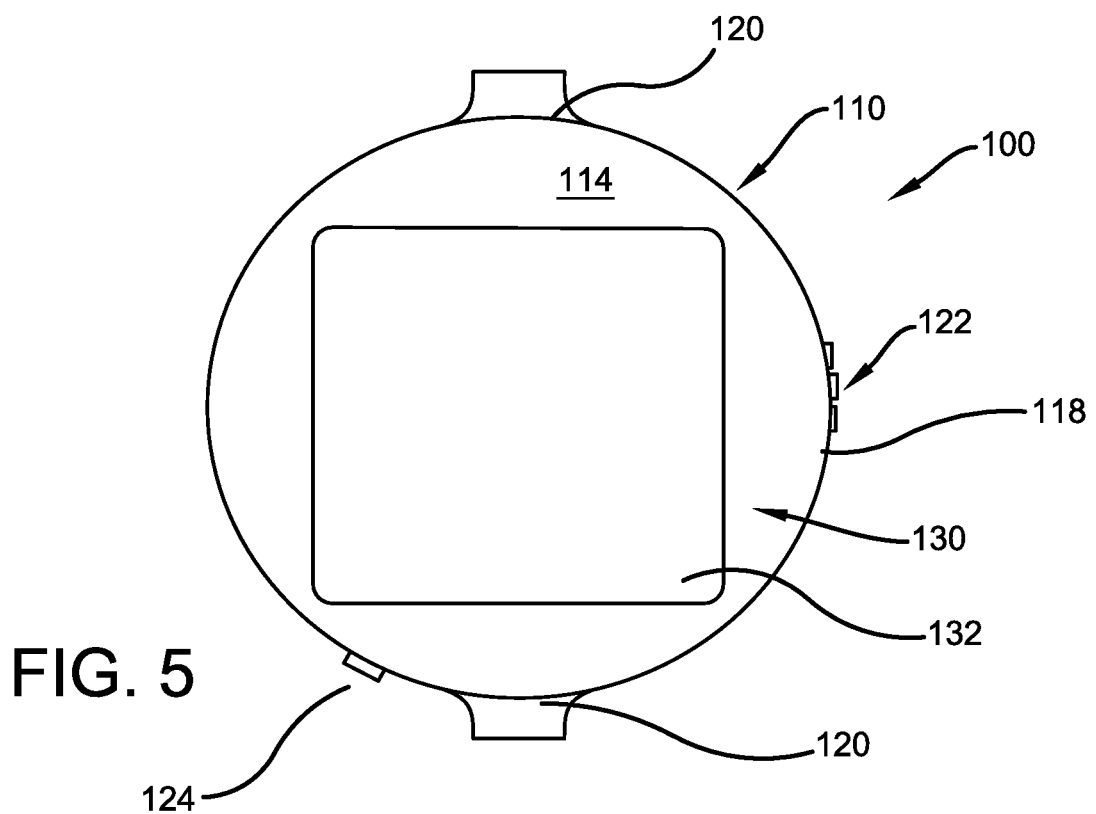
FIG. 5 illustrates a front view of a display component of the customizable digital watch of the present invention in accordance with the disclosed architecture.
Figure 6:
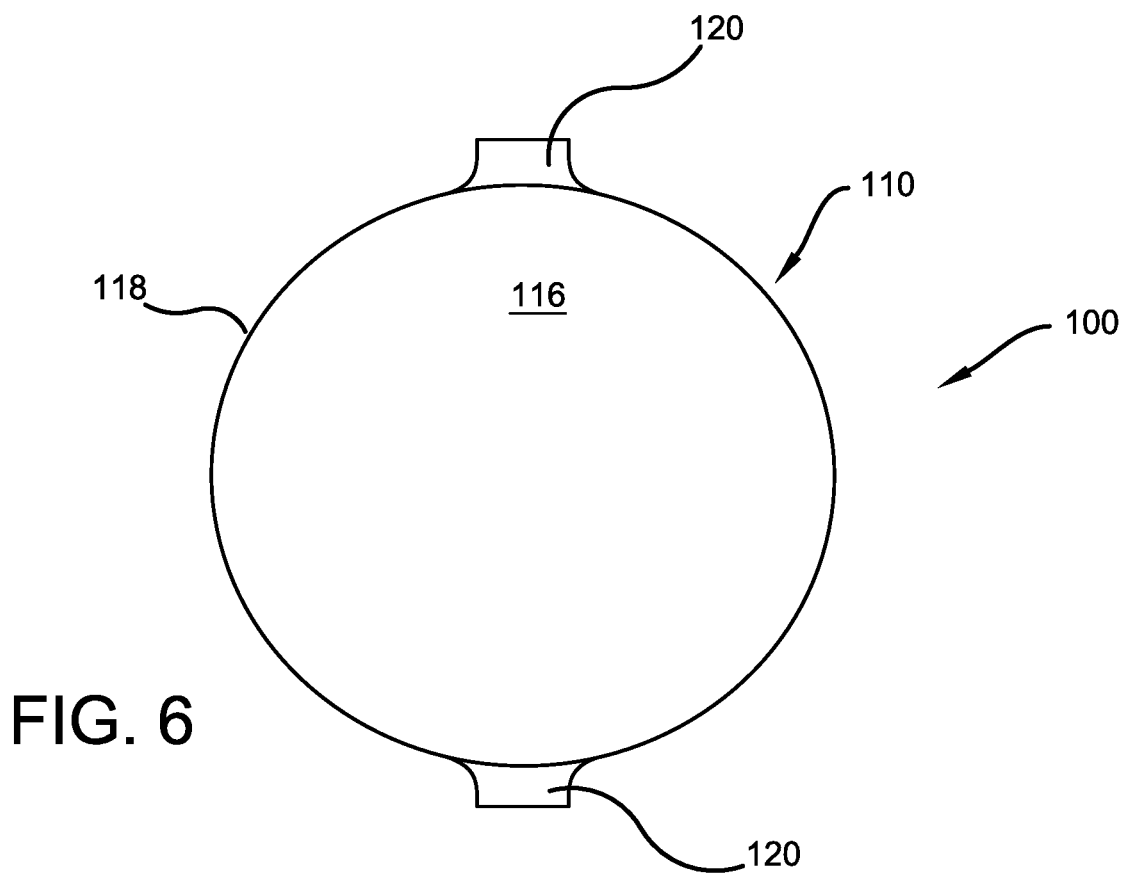
FIG. 6 illustrates a rear view of the display component of the customizable digital watch of the present invention in accordance with the disclosed architecture.
Figure 7:
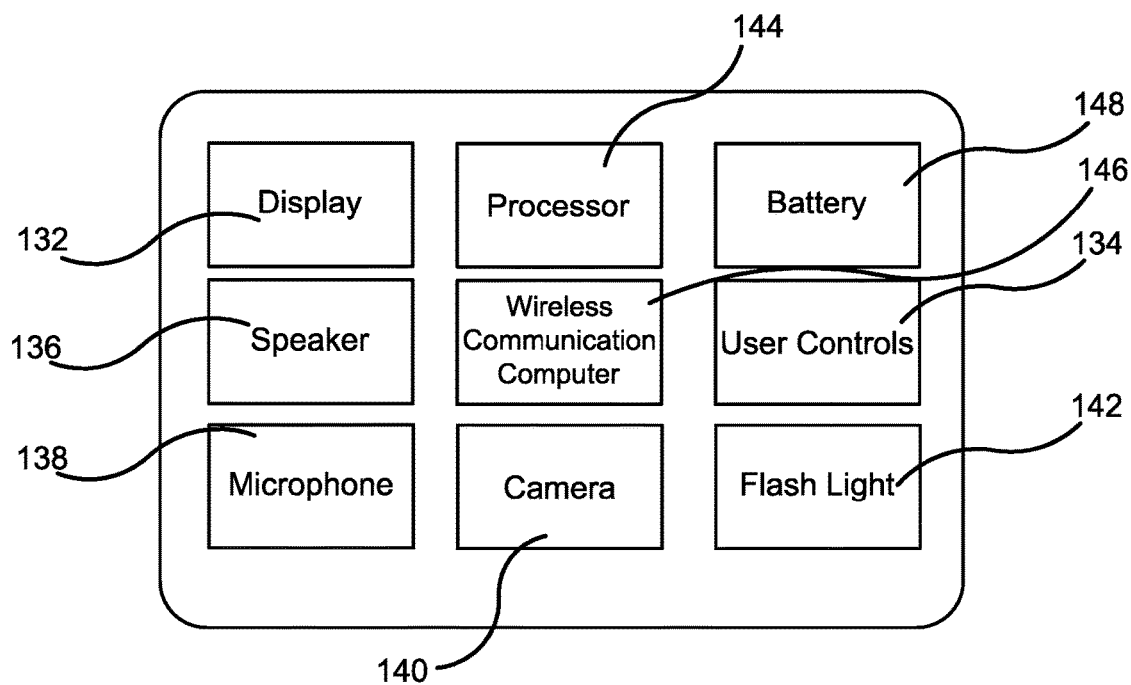
FIG. 7 illustrates a diagrammatic representation of a plurality of exemplary components of the customizable digital watch of the present invention in accordance with the disclosed architecture.

As illustrated in FIGS. 1, 3, and 7, the display component 110 further comprises a user interface 130. The user interface 130 is a display screen 132 and is configured to illuminate. The display screen 132 may utilize ambient lighting to permit viewing of displayed information and may be backlit such that the displayed information may be viewed in dark or other low-light environments. The display screen 132 is integrated into the outward facing side 114 of the housing 112. The display screen 132 may be a touch activated screen or touchscreen, such as an OLED display, an AMOLED display, an E-ink display, a traditional or sharp memory LCD display, or the like. The display screen 132 comprises a plurality of user controls 134 for operating the display component 110. The display screen 132 is used to display time and date information in addition to visual digital media.

The display component 110 may further comprise at least one speaker 136 and at least one microphone 138. The at least one speaker 136 and at least one microphone 138 are integrated into the housing 112 either on the outward facing side 114 or along the perimeter 118. The at least one speaker 136 allows the user to hear transmitted audio information, such as radio or television programming. The at least one microphone 138 allows the user the option to operate the display component 110 via voice commands, or to record audible input.

As illustrated in FIG. 7, the display component 110 may further comprise at least one processor 144 and a wireless communication component 146. The wireless communication component 146 is operatively connected to the at least one processor 144. The wireless communication component 146 is a transmitter, channel, receiver system and uses a wireless connection such as Bluetooth, Wi-Fi, GPS, NFC, or any other similar wireless technology to communicate with remote content sources to effect data transfer. The at least one processor 144 and the wireless communication component 146 operatively are retained internally within the housing 112. The wireless communication component 146 is used to wirelessly access remote audio, digital, and video content.

The wireless communication component 146 is in electronic communication with the external digital content sources, such as television, radio, or the Internet, via a network. An internal memory (not shown) may be used to store information within the display component 110. The network may be any of a number of private or public communications mechanisms such as the Internet, a local intranet, a Personal Area Network, a Local Area Network, a Wide Area Network, a Virtual Private Network, or the like. When the display component 110 is connected to the network 148, executable software instructions stored in the memory allows the at least one processor 144 to perform methods of the present technology.

The display component 110 may further comprise a digital camera 140. The digital camera 140 may be integrated into the outward facing side 114 of the housing 112 or the user interface 130. The display component 110 may further comprise a flashlight 142. The flashlight 142 may be integrated into the outward facing side 114 of the housing 112 or the user interface 130.

The customizable strap component 150 is a strap, band, or bracelet configured to fit around the user's wrist. The customizable strap component 150 may be a single stretchy strap, or a two piece band. The customizable strap component 150 may be constructed from any durable material such as silicone, rubber, plastic, leather, nylon, fibers, metal, or the like. The customizable strap component 150 comprises a pair of watch case attachment elements 168 at either end which attaches to the housing 112 at the pair of strap attachment portions 120 of the housing 112.

Figure 8:
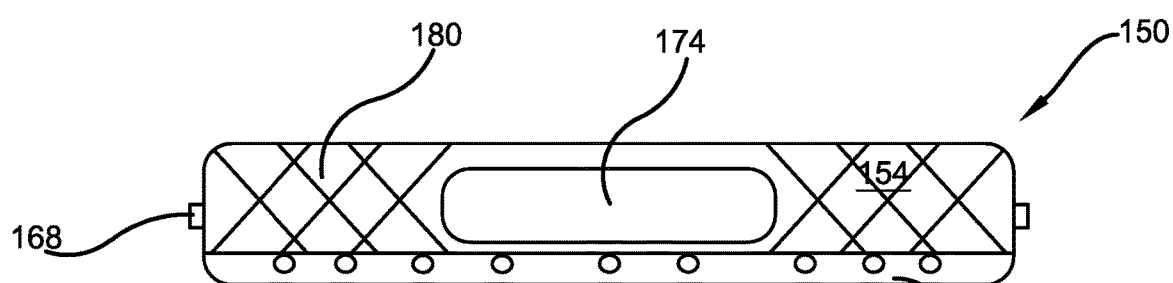
FIG. 8 illustrates a front view of a customizable strap of the customizable digital watch of the present invention in accordance with the disclosed architecture.
Figure 9:
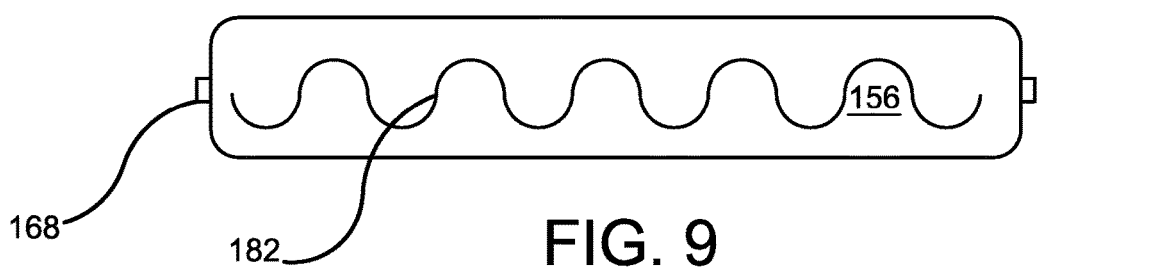
FIG. 9 illustrates a rear view of the customizable strap of the customizable digital watch of the present invention in accordance with the disclosed architecture.

As further illustrated in FIGS. 8 and 9. the customizable strap component 150 may comprise a first strap 152. The first strap 152 may be a single band. Alternatively, the customizable strap component 150 may further comprise a second strap 160. An attachment component 166 is used to adjustably connect the first 152 and second 160 straps around the user's wrist. An attachment component 166 may be a buckle, clasp, clip, magnetic closure, or the like.

The first strap 152 comprises an inside facing side 154 and an outward facing side 156. The inward facing side 154 comprises a first indicia 180 and the outward facing side 156 comprises a second indicia 182. Similarly, the second strap 160 comprises an inside facing side 162 and an outward facing side 164. The inward facing side 162 comprises the first indicia 180 and the outward facing side 164 comprises the second indicia 182. The first and second indicia 180 and 182 may be designs, images, cartoons, decorations, colors, logos, or any other type of customizable indicia that a user might desire on a watch.

Figure 10:
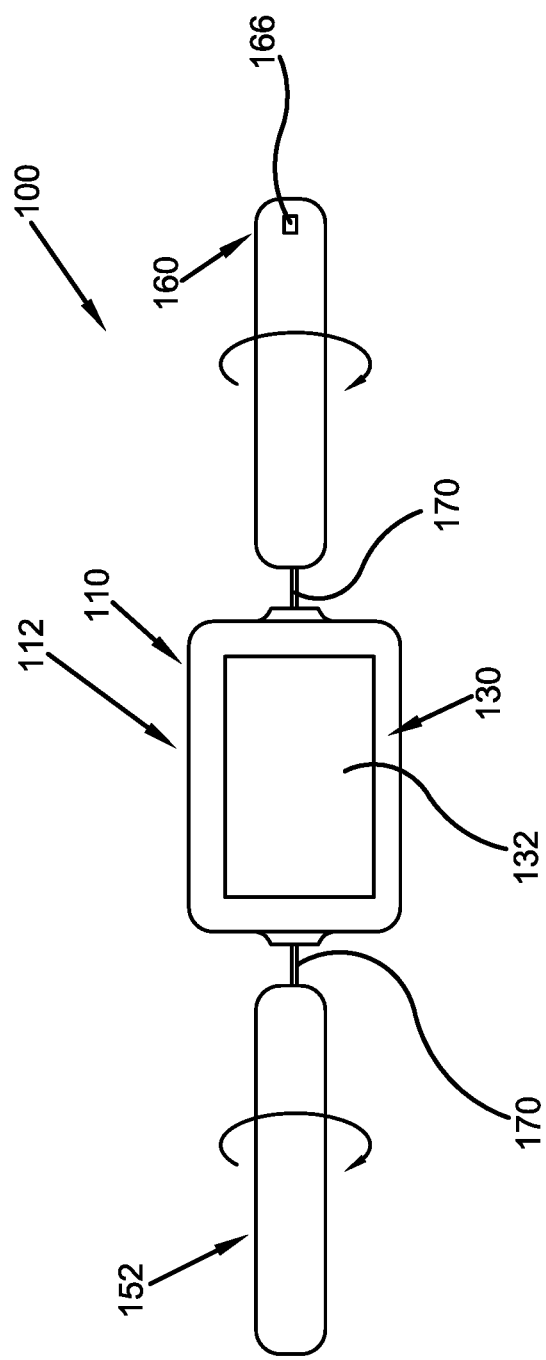
FIG. 10 illustrates a front view of the customizable digital watch of the present invention in accordance with the disclosed architecture.

As illustrated in FIG. 10, each of the strap attachment portions 120 or watch case attachment elements 168 may be rotatable allowing the customizable strap component 150 to reverse in orientation so that the first indicia 180 on the inward facing sides 154 and 162 faces outward and the second indicia 182 on the outward facing sides 156 and 164 no faces inward. Each watch case attachment elements 168 may be a swivel coupling 170 allowing the rotation of the customizable strap component 150. Alternatively, the customizable strap component 150 may detach from the display component 110 and be reversed when reattached.

The customizable strap component 150 may further comprise an illuminating element 172. The illuminating element 172 may be a LED light strip incorporated into or otherwise attached to either the first strap 152, the second strap 160, or both configured to illuminate separately from or in conjunction with the user interface 130. Alternatively, the illuminating element 172 may be a fluorescent coating so that the customizable strap component 150 fluoresces or glows in the dark. The customizable strap component 150 may further comprise a flexible digital screen 174. The flexible digital screen 174 may be incorporated into or otherwise attached to the first strap 152 or the second strap 160. The flexible digital screen 174 is configured to display time and date information in addition to visual digital media in conjunction with the display screen 132 of the display component 110.

Notwithstanding the forgoing, the customizable digital watch 100 can be any suitable size, shape, and configuration as is known in the art without affecting the overall concept of the invention, provided that it accomplishes the above stated objectives. One of ordinary skill in the art will appreciate that the shape and size of the customizable digital watch 100 and its various components, as show in the FIGS. are for illustrative purposes only, and that many other shapes and sizes of the customizable digital watch 100 are well within the scope of the present disclosure. Although dimensions of the customizable digital watch 100 and its components (i.e., length, width, and height) are important design parameters for good performance, the customizable digital watch 100 and its various components may be any shape or size that ensures optimal performance during use and/or that suits user need and/or preference. As such, the customizable digital watch 100 may be comprised of sizing/shaping that is appropriate and specific in regard to whatever the customizable digital watch 100 is designed to be applied.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A customizable digital watch comprising:
   a display component comprising a housing comprising a plurality of user controls, a user interface comprising an illuminating display screen integrated into the housing, at least one processor, and a wireless communication component; and
   a customizable strap component comprising a first indicia on an inside facing side and a second indicia on an outside facing side attachable to the housing at a pair of strap attachment portions of the housing; and
   wherein the customizable strap component is reversible and the display component is configured to receive and audio and video signals,
   wherein the customizable strap component further comprises a fluorescent coating;
   wherein the customizable strap component further comprises a flexible digital screen integrated into the customizable strap component; and
   further wherein the pair of strap attachment portions are rotatable.

2. The customizable digital watch of claim 1, wherein the customizable strap component comprises a first strap and a second strap.

3. The customizable digital watch of claim 1, wherein the pair of strap attachment portions each comprise a swivel coupling.

4. The customizable digital watch of claim 1, wherein the flexible digital screen is integrated into the outside facing side.

5. A customizable digital watch comprising:
   a display component comprising a housing comprising a plurality of user controls, a user interface comprising an illuminating display screen integrated into the housing, a speaker, a microphone, at least one processor, and a wireless communication component configured to communicate via GPS, Wi-Fi, Bluetooth, or NFC; and
   a customizable strap component comprising a first indicia on an inside facing side and a second indicia on an outside facing side rotatably attachable to the housing at a pair of strap attachment portions of the housing; and
   wherein the customizable strap component is reversible and the display component is configured to receive audio and video signals,
   wherein the customizable strap component further comprises a first strap and a second strap; and
   wherein the first strap comprises a LED strip integrated into the outside facing side of the first strap; and
   wherein the second strap comprises a flexible digital screen integrated into the outside facing side of the first strap.

* * * * *